United States Patent
Groninga et al.

(10) Patent No.: US 11,220,852 B2
(45) Date of Patent: Jan. 11, 2022

(54) AIRCRAFT HAVING VERSATILE DOOR SYSTEMS

(71) Applicant: Textron Innovations Inc., Providence, RI (US)

(72) Inventors: Kirk Landon Groninga, Keller, TX (US); Daniel Bryan Robertson, Southlake, TX (US)

(73) Assignee: Textron Innovations Inc., Providence, RI (US)

( * ) Notice: Subject to any disclaimer, the term of this patent is extended or adjusted under 35 U.S.C. 154(b) by 313 days.

(21) Appl. No.: 16/401,475

(22) Filed: May 2, 2019

(65) Prior Publication Data
US 2020/0347656 A1    Nov. 5, 2020

(51) Int. Cl.
  *E05D 15/58*   (2006.01)
  *B64C 1/14*    (2006.01)
  *B64C 27/04*   (2006.01)

(52) U.S. Cl.
  CPC ............ *E05D 15/58* (2013.01); *B64C 1/1423* (2013.01); *B64C 1/1438* (2013.01); *B64C 27/04* (2013.01); *E05Y 2900/502* (2013.01)

(58) Field of Classification Search
  CPC .. E05D 15/58; B60J 5/06; B60J 5/062; B64C 1/1438; B64C 1/1423
  See application file for complete search history.

(56) References Cited

U.S. PATENT DOCUMENTS

| | | | | |
|---|---|---|---|---|
| 2,445,131 A * | 7/1948 | Wartian | ................ | B64C 1/1407 244/129.5 |
| 3,105,659 A * | 10/1963 | Stutz | ....................... | B64C 27/26 244/7 R |
| 4,589,611 A * | 5/1986 | Ramme | ................... | B64C 27/10 244/12.3 |
| 4,619,074 A * | 10/1986 | Leung | ..................... | E05D 15/58 49/125 |
| 5,140,316 A * | 8/1992 | DeLand | ..................... | B60J 5/06 180/271 |
| 5,337,977 A | 8/1994 | Fleming et al. | | |
| 5,438,800 A * | 8/1995 | Porter | ...................... | B60J 5/062 49/209 |
| 6,126,114 A | 10/2000 | Victor | | |
| 6,189,833 B1 | 2/2001 | Ambrose et al. | | |
| 7,950,439 B2 * | 5/2011 | Anderson | ............... | E05D 15/58 160/211 |

(Continued)

*Primary Examiner* — Christopher D Hutchens
(74) *Attorney, Agent, or Firm* — Lawrence Youst PLLC

(57) ABSTRACT

A versatile door system for an aircraft includes forward and aft door assemblies. The forward door assembly includes a forward hingeable door hingeably coupled to the airframe proximate a forward location of an aircraft opening and a forward slidable door slidably coupled to the forward hingeable door. The aft door assembly includes an aft hingeable door hingeably coupled to the airframe proximate an aft location of the aircraft opening and an aft slidable door slidably coupled to the aft hingeable door. In a closed configuration, the forward hingeable door, the forward slidable door, the aft hingeable door and the aft slidable door are securably disposed within the aircraft opening. In operation, the forward hingeable door, the forward slidable door, the aft hingeable door and the aft slidable door are individually operable to collectively provide access to a selectable width of the aircraft opening.

20 Claims, 7 Drawing Sheets

(56) References Cited

U.S. PATENT DOCUMENTS

| | | | |
|---|---|---|---|
| 8,146,864 B2 | 4/2012 | Köppel et al. | |
| 8,756,864 B2 * | 6/2014 | Hamaker | E06B 3/5072 |
| | | | 49/143 |
| 9,074,398 B2 * | 7/2015 | Maruyama | E05D 15/1047 |
| 10,173,783 B2 | 1/2019 | Cadet et al. | |
| 2006/0197357 A1 * | 9/2006 | Catania | B60J 5/12 |
| | | | 296/155 |
| 2010/0224720 A1 * | 9/2010 | Roesch | B64C 27/26 |
| | | | 244/12.3 |
| 2010/0242366 A1 * | 9/2010 | Liebscher | E05D 15/58 |
| | | | 49/142 |
| 2012/0167468 A1 * | 7/2012 | Hozumi | B60J 5/06 |
| | | | 49/209 |
| 2013/0227887 A1 * | 9/2013 | Ojima | B60J 5/0477 |
| | | | 49/143 |
| 2014/0061367 A1 * | 3/2014 | Fink | B64C 27/26 |
| | | | 244/6 |
| 2016/0245006 A1 * | 8/2016 | Joussellin | E06B 3/46 |
| 2017/0291689 A1 * | 10/2017 | Halcom | B64C 27/20 |

\* cited by examiner

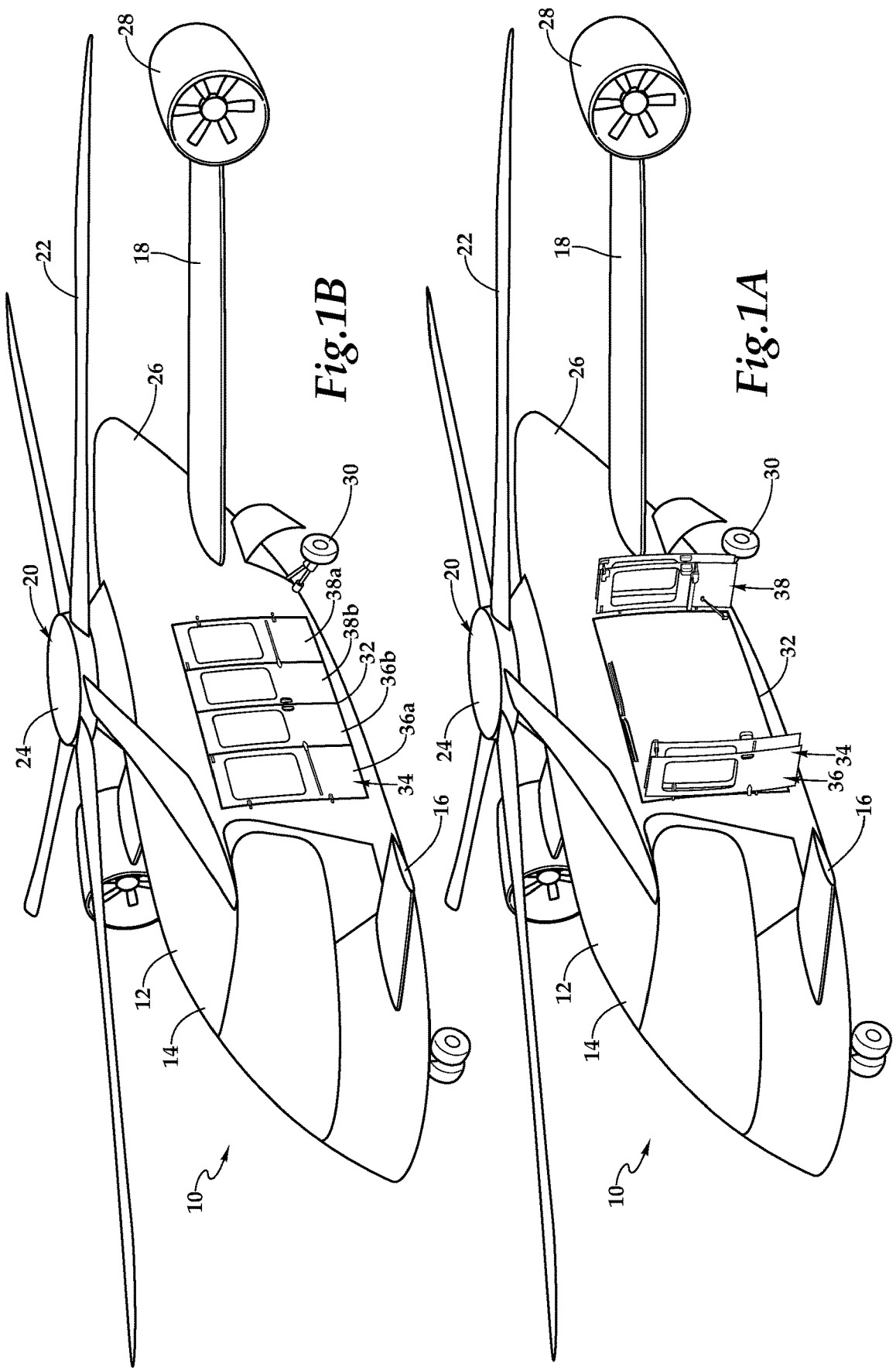

AIRCRAFT HAVING VERSATILE DOOR SYSTEMS

TECHNICAL FIELD OF THE DISCLOSURE

The present disclosure relates, in general, to door systems for aircraft and, in particular, to versatile door systems for aircraft including multiple door assemblies each having multiple doors that are individually operable to collectively provide access to a selectable portion of the aircraft opening.

BACKGROUND

Conventional, helicopters have a limited top speed due to the problem of retreating blade stall, in which the rotor blade on the retreating side of the rotor disc in forward flight experiences a loss of lift due to the rotorcraft's linear forward flight velocity exceeding the rotor blade's minimum angular velocity for lift production. Attempts have been made to overcome retreating blade stall and to increase the top speed of rotorcraft. For example, various compound helicopter designs have been attempted that utilize lift compounding, propulsion compounding or both to improve top speed. Lift compounding may be achieved by adding wings to the fuselage to partially offload the lift requirement from the main rotor during forward flight. Propulsion compounding may be achieved by adding auxiliary propulsive systems such as propellers or jets to partially or fully offload the forward thrust requirement from the main rotor during forward flight. Utilizing both wings for lift compounding and auxiliary propulsive systems for propulsion compounding may be referred to as fully compounding. It has been found, however, that due to the positioning of the wings and/or the auxiliary propulsive systems on the rotorcraft fuselage as well as the contour of the aircraft afterbody, compound helicopters often have limited space for an aftwardly sliding door, particularly when a wide opening is desired for enabling multi-role capabilities.

SUMMARY

In a first aspect, the present disclosure is directed to a versatile door system for an aircraft having an airframe with an aircraft opening. The door system includes a forward door assembly and an aft door assembly. The forward door assembly includes a forward hingeable door and a forward slidable door. The forward hingeable door is hingeably coupled to the airframe proximate a forward location of the aircraft opening. The forward slidable door is slidably coupled to the forward hingeable door. The aft door assembly includes an aft hingeable door and an aft slidable door. The aft hingeable door is hingeably coupled to the airframe proximate an aft location of the aircraft opening. The aft slidable door is slidably coupled to the aft hingeable door. In a closed configuration, the forward hingeable door, the forward slidable door, the aft hingeable door and the aft slidable door are securably disposed within the aircraft opening. In operation, the forward hingeable door, the forward slidable door, the aft hingeable door and the aft slidable door are individually operable to collectively provide access to a selectable width of the aircraft opening.

In certain embodiments, the forward slidable door may have a closed position in which the forward slidable door is disposed within the aircraft opening and is longitudinally aligned with the forward hingeable door. The forward slidable door may also have an open position in which the forward slidable door is slid forward and into an exterior position relative to the forward hingeable door. In such embodiments, the forward hingeable door may have a closed position in which the forward hingeable door is disposed within the aircraft opening and an open position in which the forward hingeable door is pivoted forward relative to the forward location of the aircraft opening, together with the forward slidable door. Also, in such embodiments, the aft slidable door may have a closed position in which the aft slidable door is disposed within the aircraft opening and is longitudinally aligned with the aft hingeable door. The aft slidable door may also have an open position in which the aft slidable door is slid aft and into an exterior position relative to the aft hingeable door. Additionally, in such embodiments, the aft hingeable door may have a closed position in which the aft hingeable door is disposed within the aircraft opening and an open position in which the aft hingeable door is pivoted aft relative to the aft location of the aircraft opening, together with the aft slidable door.

In some embodiments, in an open configuration of the door system, the forward slidable door is in the open position, the forward hingeable door is in the closed position, the aft slidable door is in the closed position and the aft hingeable door is in the closed position such that the door system provides access to about a quarter width of the aircraft opening. In certain embodiments, in an open configuration, the forward slidable door is in the closed position, the forward hingeable door is in the closed position, the aft slidable door is in the open position and the aft hingeable door is in the closed position such that the door system provides access to about a quarter width of the aircraft opening. In some embodiments, in an open configuration, the forward slidable door is in the open position, the forward hingeable door is in the open position, the aft slidable door is in the closed position and the aft hingeable door is in the closed position such that the door system provides access to about a half width of the aircraft opening. In certain embodiments, in an open configuration, the forward slidable door is in the open position, the forward hingeable door is in the closed position, the aft slidable door is in the open position and the aft hingeable door is in the closed position such that the door system provides access to about a half width of the aircraft opening.

In some embodiments, in an open configuration, the forward slidable door is in the closed position, the forward hingeable door is in the closed position, the aft slidable door is in the open position and the aft hingeable door is in the open position such that the door system provides access to about a half width of the aircraft opening. In certain embodiments, in an open configuration, the forward slidable door is in the open position, the forward hingeable door is in the open position, the aft slidable door is in the open position and the aft hingeable door is in the closed position such that the door system provides access to about a three quarter width of the aircraft opening. In some embodiments, in an open configuration, the forward slidable door is in the open position, the forward hingeable door is in the closed position, the aft slidable door is in the open position and the aft hingeable door is in the open position such that the door system provides access to about a three quarter width of the aircraft opening. In certain embodiments, in an open configuration, the forward slidable door is in the open position, the forward hingeable door is in the open position, the aft slidable door is in the open position and the aft hingeable door is in the open position such that the door system provides access to about a full width of the aircraft opening.

In some embodiments, when the forward slidable door is in the open position, the forward slidable door is secured against movement relative to the forward hingeable door. In certain embodiments, when the aft slidable door is in the open position, the aft slidable door is secured against movement relative to the aft hingeable door. In some embodiments, in the closed configuration, the forward hingeable door, the forward slidable door, the aft hingeable door and the aft slidable door are latched to the airframe. In certain embodiments, the door system includes a rail system having a forward upper rail, a forward lower rail, an aft upper rail and an aft lower rail. In such embodiments, the forward upper rail and the aft upper rail may be coupled to the airframe, the forward lower rail may be coupled to the forward hingeable door and the aft lower rail may be coupled to the aft hingeable door such that the forward slidable door travels on the forward upper rail and the forward lower rail between open and closed positions and the aft slidable door travels on the aft upper rail and the aft lower rail between open and closed positions.

In some embodiments, the forward hingeable door may be operable to rotate between about ninety degrees and about one hundred degrees relative to the forward location of the aircraft opening. In certain embodiments, the aft hingeable door may be operable to rotate between about ninety degrees and about one hundred degrees relative to the aft location of the aircraft opening. In some embodiments, the forward slidable door may have an interior door handle and an exterior door handle for opening and closing the forward slidable door. In certain embodiments, the aft slidable door may have an interior door handle and an exterior door handle for opening and closing the aft slidable door. In some embodiments, the forward hingeable door may have an interior door handle for opening and closing the forward hingeable door. In certain embodiments, the aft hingeable door may have an interior door handle for opening and closing the aft hingeable door.

In a second aspect, the present disclosure is directed to an aircraft that includes an airframe having an aircraft opening and a versatile door system coupled to the airframe. The door system includes a forward door assembly and an aft door assembly. The forward door assembly includes a forward hingeable door and a forward slidable door. The forward hingeable door is hingeably coupled to the airframe proximate a forward location of the aircraft opening. The forward slidable door is slidably coupled to the forward hingeable door. The aft door assembly includes an aft hingeable door and an aft slidable door. The aft hingeable door is hingeably coupled to the airframe proximate an aft location of the aircraft opening. The aft slidable door is slidably coupled to the aft hingeable door. In a closed configuration, the forward hingeable door, the forward slidable door, the aft hingeable door and the aft slidable door are securably disposed within the aircraft opening. In operation, the forward hingeable door, the forward slidable door, the aft hingeable door and the aft slidable door are individually operable to collectively provide access to a selectable width of the aircraft opening.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 1A-1B are schematic illustrations of a compound rotorcraft having a versatile door system in accordance with embodiments of the present disclosure;

DETAILED DESCRIPTION

Figure 2B:
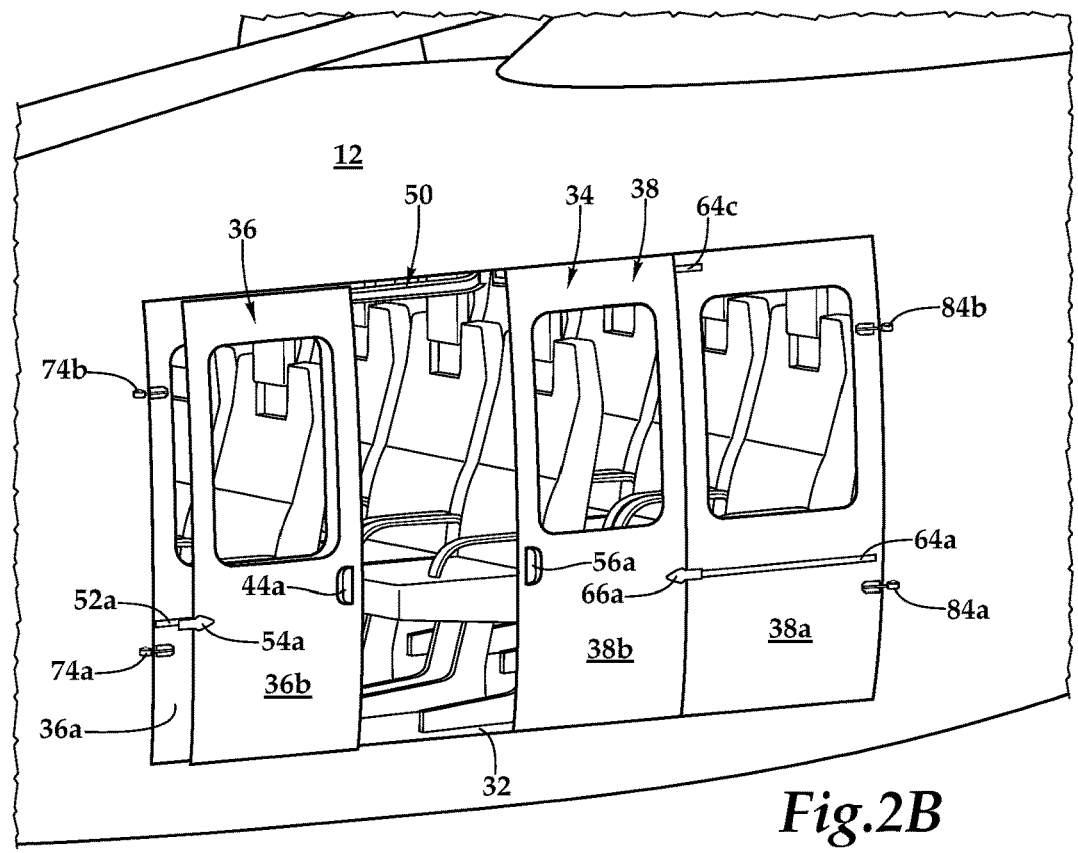
FIGS. 2A-2I are schematic illustrations of a versatile door system for an aircraft in various positions providing access to selectable widths of the aircraft opening in accordance with embodiments of the present disclosure.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Referring to FIGS. 1A-1B in the drawings, an aircraft having a versatile door system of the present disclosure is schematically illustrated and generally designated 10. In the illustrated embodiment, the aircraft is depicted as a rotorcraft in the form of a helicopter and more precisely in the form of a compound helicopter, which may be referred to herein as helicopter 10. Helicopter 10 includes an airframe 12 having a fuselage 14, wings 16 and wings 18. In the illustrated embodiment, wings 16 extend laterally from a forward portion of fuselage 14 and wings 18 extend laterally from an aft portion of fuselage 14. Wings 16, 18 provide a means for lift compounding responsive to the forward airspeed of helicopter 10 that offloads a portion of the lift requirements from a main rotor assembly 20. Although wings 16 are depicted as straight wings and wings 18 are depicted as aft swept wings, it will be appreciated that wings 16, 18 may be of a wide variety of shapes, sizes and configurations, depending upon the performance characteristics desired.

Main rotor assembly 20 is depicted as a single main rotor with five rotor blades 22 extending radially outward from a main rotor hub 24. Although main rotor assembly 20 has been depicted as having five rotor blades 24 with a particular design, it will be appreciated that main rotor assembly 20 may have other numbers of rotor blades both greater than or less than five and rotor blades 22 may be of a wide variety of shapes, sizes and configurations, depending upon the performance characteristics desired. Main rotor assembly 20 is coupled to fuselage 14 and is rotatable relative thereto. The pitch of rotor blades 22 can be collectively and/or cyclically manipulated by a pitch control assembly (not visible) to selectively control direction, thrust and lift of helicopter 10.

Helicopter 10 is powered by a turboshaft engine located in a tail cone 26 of fuselage 14. The engine provides torque and rotational energy to main rotor assembly 20 via a drive shaft, a main rotor gearbox and a main rotor shaft (not visible). Helicopter 10 includes an auxiliary propulsion system that provides propulsion compounding for helicopter 10 in the form of ducted fans 28 that are coupled to outboard ends of wings 18. Ducted fans 28 may having variable or fixed pitch blades and are preferably variable speed ducted fans. In the illustrated embodiment, ducted fans 28 are driven by inline mounted electric motors that are powered by batteries and/or an electric generator driven by the engine of helicopter 10. In other embodiments, ducted fans 28 could be mechanically driven by the engine of helicopter 10 via suitable clutching, shafting and gear systems.

In the illustrated embodiment, ducted fans 28 operate as the anti-torque system for helicopter 10 to counteracting the torque exerted on fuselage 14 by main rotor assembly 20. In other embodiments, helicopter 10 may include a dedicated anti-torque system such as a tail rotor assembly that is rotatably coupled to tail cone 26. Such a tail rotor assembly may have variable pitch tail rotor blades whose pitch is changeable by a pitch change mechanism to control the anti-torque thrust. In another example, the tail rotor blades may be fixed pitch and may generate anti-torque thrust responsive to variable rotational speed. In such an embodiment, the anti-torque system may include a variable speed electric motor for rotating the tail rotor assembly. In other embodiments, the anti-torque system may include a hydraulic motor or the tail rotor assembly may be mechanically driven by a tail rotor drive shaft coupled to the main rotor gearbox.

From takeoff through the low speed cruise regime of helicopter 10, engine power is directed to main rotor assembly 20. As helicopter 10 increases forward velocity, wings 16, 18 provide lift compounding by unloading a portion of the lift requirement from main rotor system 20. In addition, as the power requirement on the engine is reduced in forward flight, available engine power can be extracted by engaging an electric generator that provides electrical power to ducted fans 28 to provide additional forward thrust to accelerate helicopter 10 to the high speed cruise regime. Importantly, the use of ducted fans 28 allows helicopter 10 to achieve increased forward airspeed.

In the illustrated embodiment, helicopter 10 has a retractable land gear system 30 that is depicted in the deployed positioned such that helicopter 10 is configured for ground operations. It should be noted that helicopter 10 may be a multi-role helicopter suitable for missions including transport of troops, internal and/or external lifts, medevac operations, search and rescue missions, special operations and cargo transportation to name a few. Helicopter 10 includes a large aircraft opening 32 and a versatile door system 34 to facilitate the varied requirements for such multi-role access in and out of helicopter 10. In the illustrated embodiment, versatile door system 34 includes a forward door assembly 36 and an aft door assembly 38 depicted in the fully open configuration in FIG. 1A and the closed configuration in FIG. 1B.

Forward door assembly 36 includes a forward hingeable door 36a and a forward slidable door 36b. Forward hingeable door 36a is hingeably coupled to airframe 12 proximate a forward location of aircraft opening 32. Forward slidable door 36b is slidably coupled to forward hingeable door 36a. Aft door assembly 38 includes an aft hingeable door 38a and an aft slidable door 38b. Aft hingeable door 38a is hingeably coupled to airframe 12 proximate an aft location of aircraft opening 32. Aft slidable door 38b is slidably coupled to aft hingeable door 38a. In the closed configuration of versatile door system 34, forward hingeable door 36a, forward slidable door 36b, aft hingeable door 38a and aft slidable door 38b are securably disposed within aircraft opening 32, thereby preventing access to aircraft opening 32. As discussed herein, forward hingeable door 36a, forward slidable door 36b, aft hingeable door 38a and aft slidable door 38b are individually operable to collectively provide access to a selectable width of aircraft opening 32. Preferably, forward door assembly 36 rotates between about ninety degrees and about one hundred degrees forward relative to aircraft opening 32 and aft door assembly 38 rotates between about ninety degrees and about one hundred degrees aft relative to aircraft opening 32 such that neither forward door assembly 36 nor aft door assembly 38 contact other airframe components such as wings 16, 18 during opening or closing operations.

It should be appreciated that helicopter 10 is merely illustrative of a variety of aircraft that can implement the embodiments disclosed herein. Indeed, versatile door system 34 may be implemented on any aircraft. Other aircraft implementations can include hybrid aircraft, tiltwing aircraft, tiltrotor aircraft, unmanned aircraft, multirotor air taxis, gyrocopters, fixed wing aircraft, drones and the like. As such, those skilled in the art will recognize that versatile door system 34 can be integrated into a variety of aircraft configurations. It should be appreciated that even though aircraft are particularly well-suited to implement the embodiments of the present disclosure, non-aircraft vehicles and devices can also implement the embodiments.

Figure 2A:
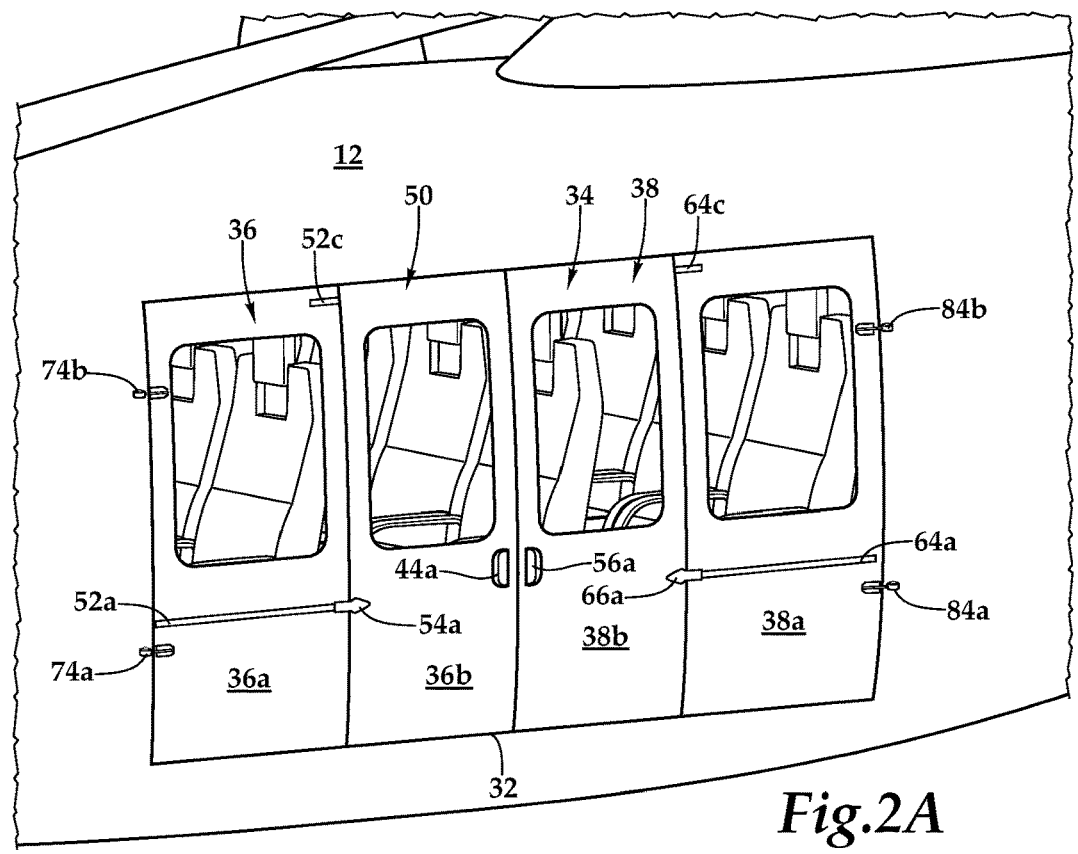
Figure 2D:
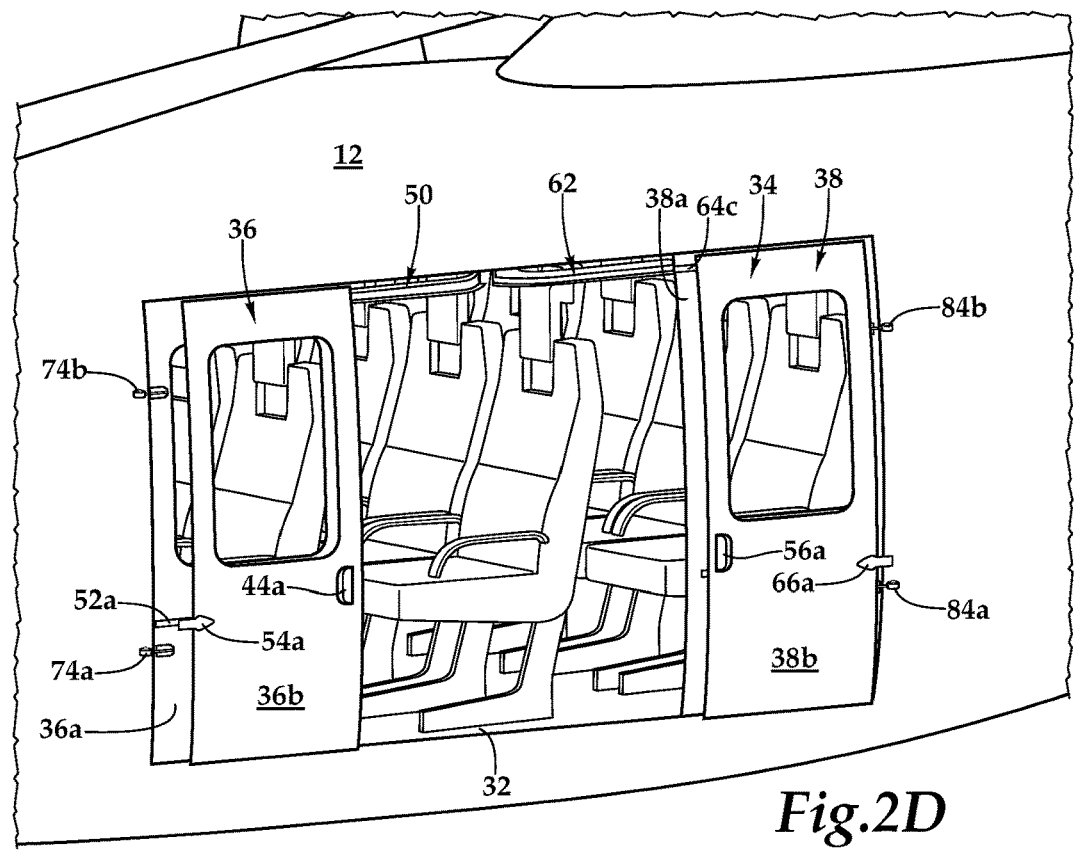
Figure 2C:
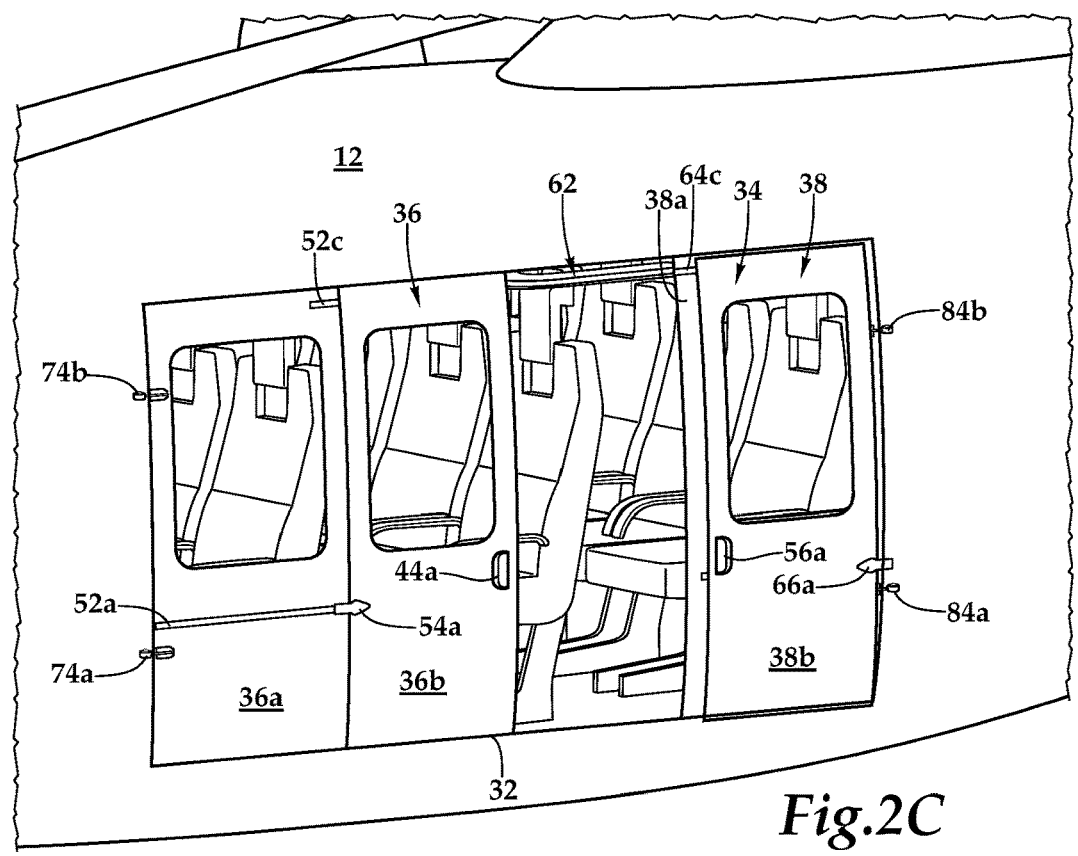
Figure 2F:
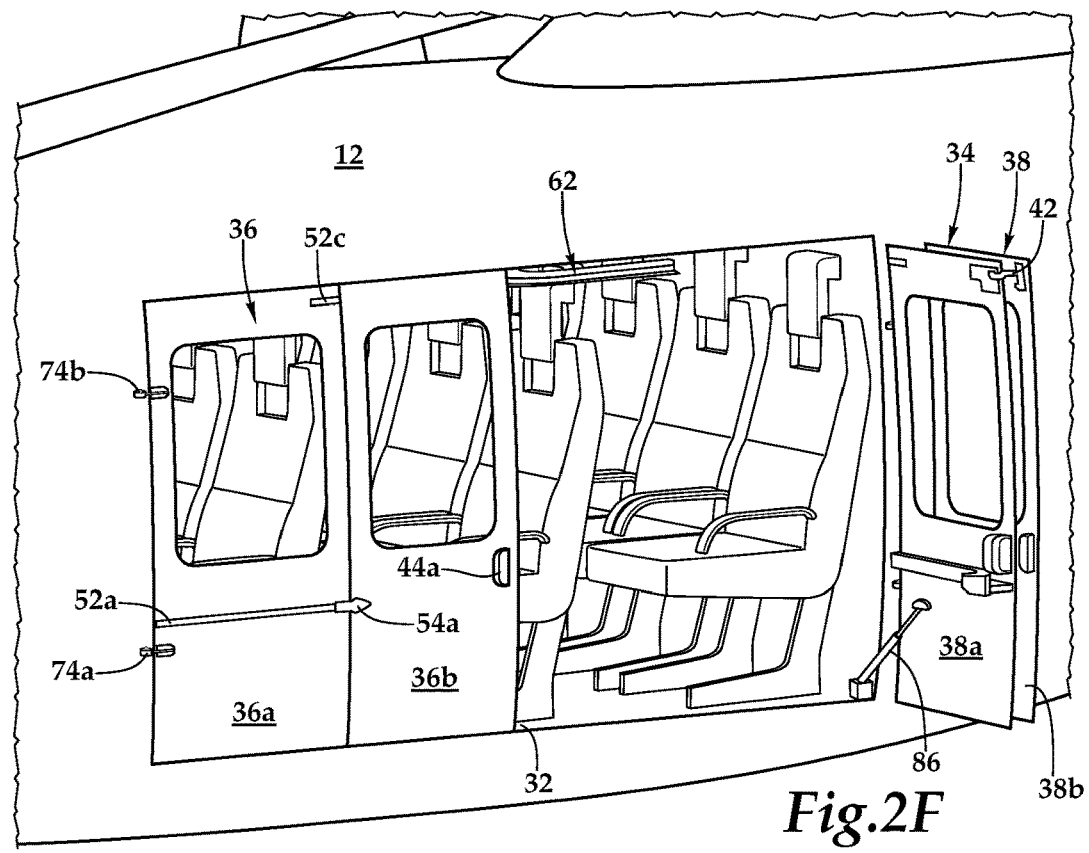
Figure 2E:
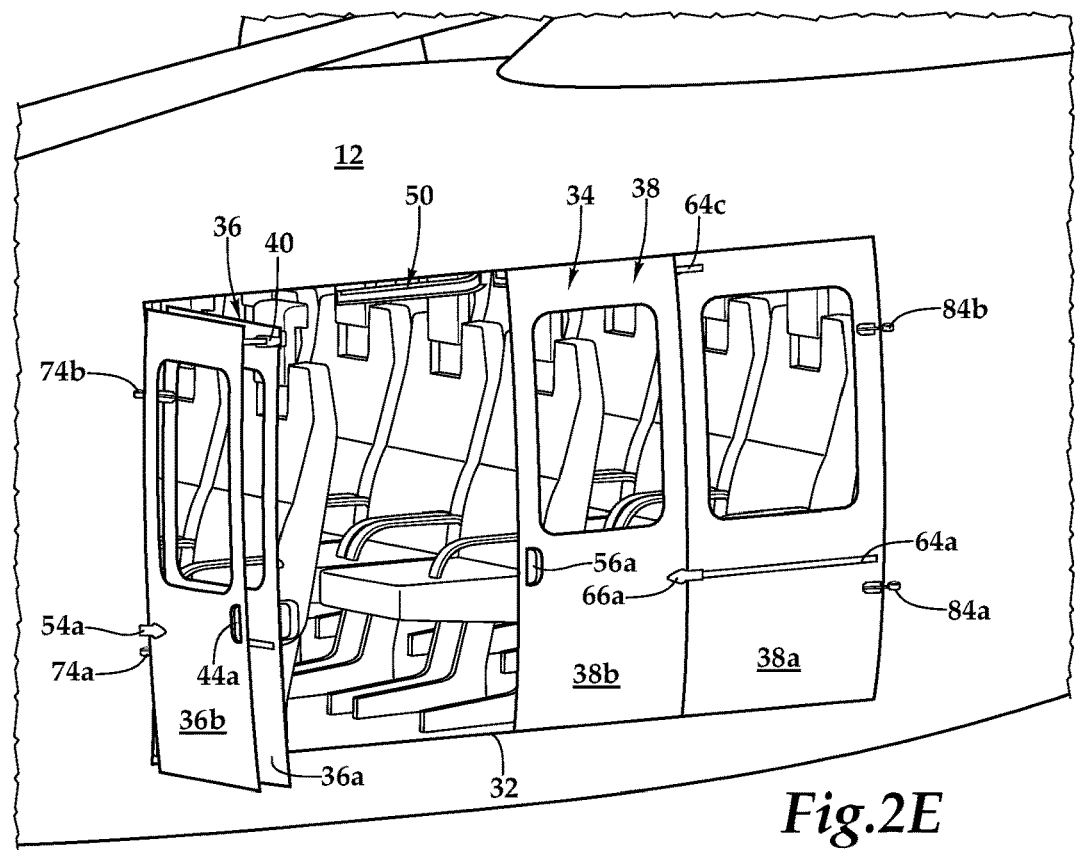
Figure 2H:
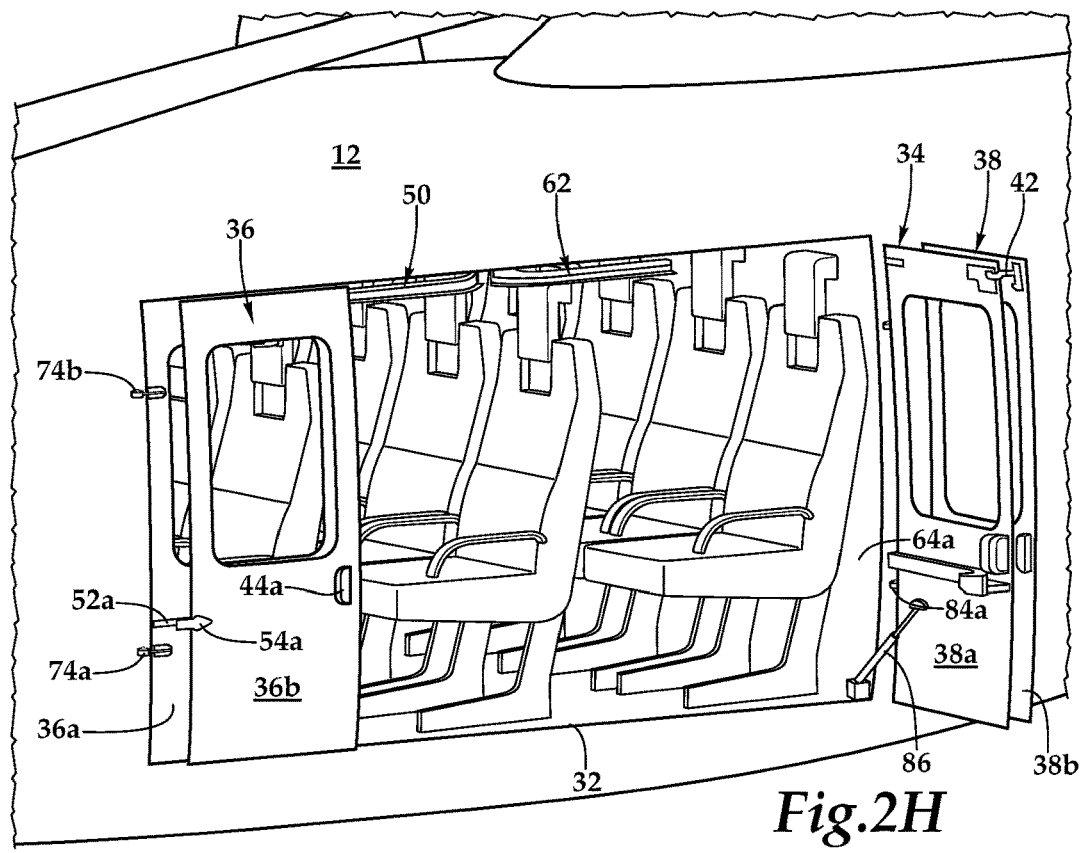
Figure 2G:
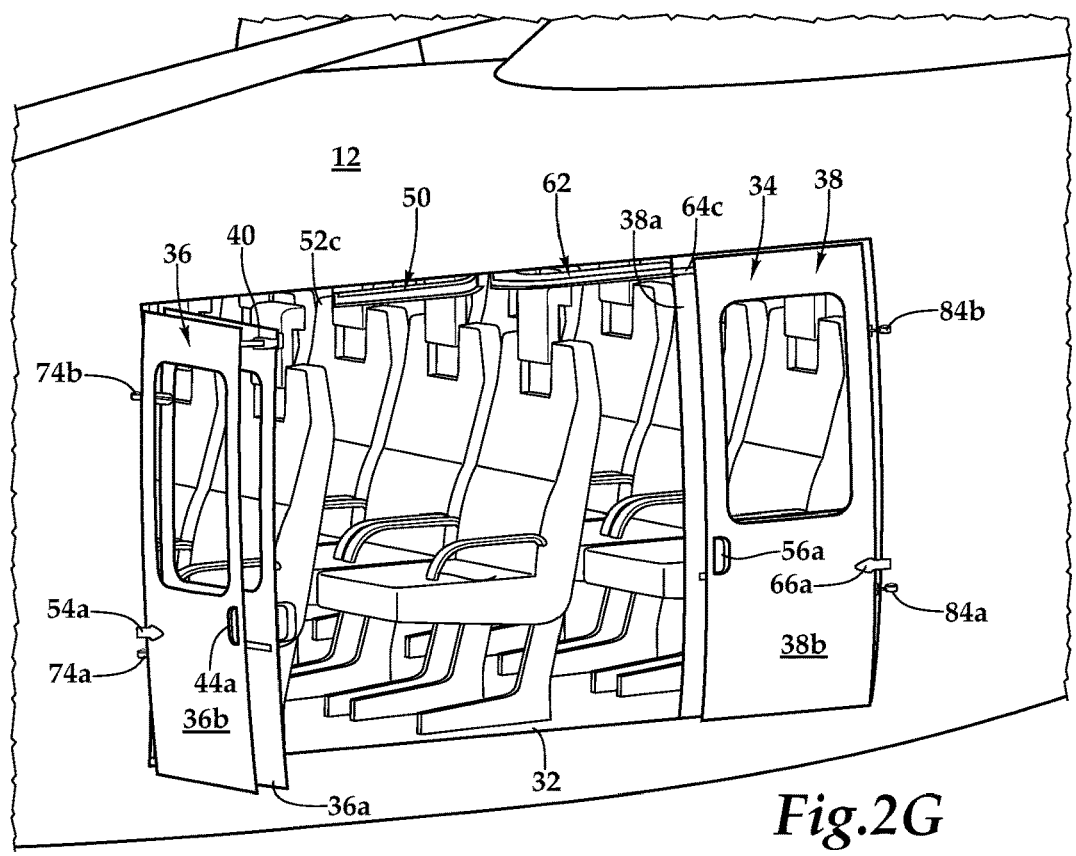
Figure 2I:
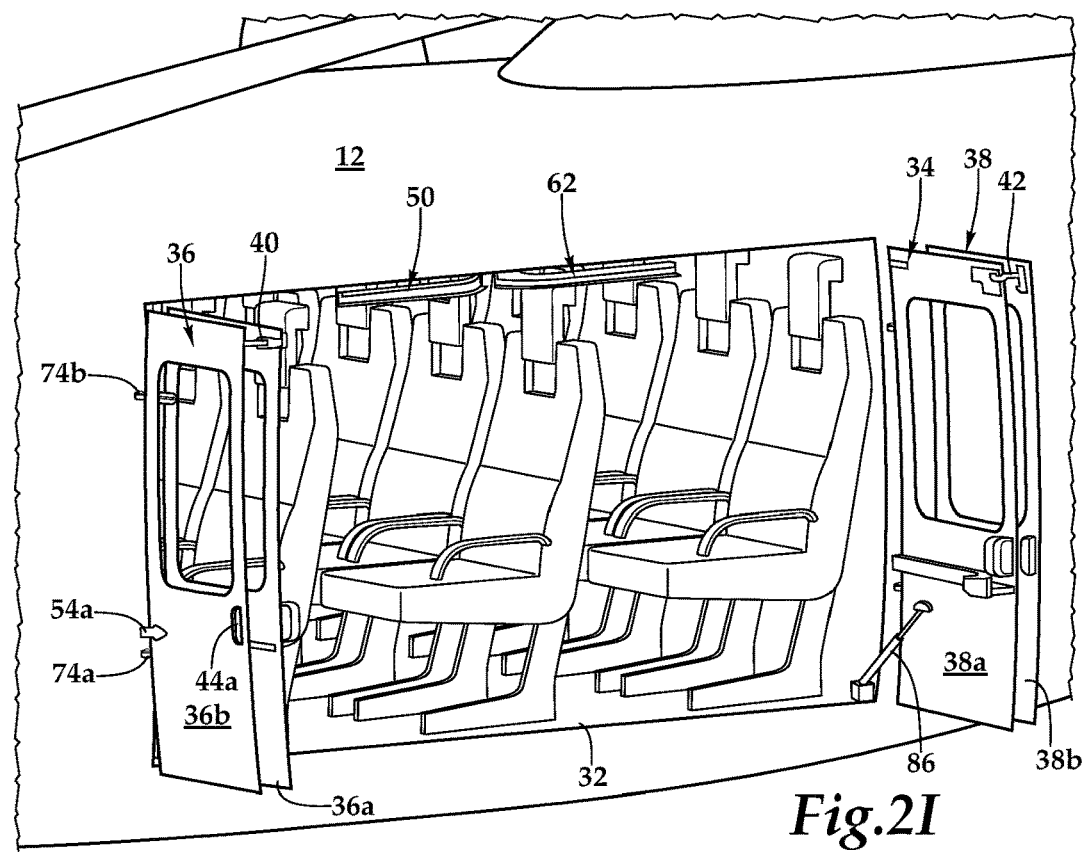

Referring additionally to FIGS. 2A-2I of the drawings, the versatile operations of door system 34 will now be described. Each of forward hingeable door 36a, forward slidable door 36b, aft hingeable door 38a and aft slidable door 38b has an open position and a closed position such that forward hingeable door 36a, forward slidable door 36b, aft hingeable door 38a and aft slidable door 38b collectively provide access to selectable widths of aircraft opening 32 including a quarter width of aircraft opening 32, a half width of aircraft opening 32, a three quarter width of aircraft opening 32 and a full width of aircraft opening 32. For example, forward slidable door 36b has a closed position in which forward slidable door 36b is securably disposed within aircraft opening 32 and is longitudinally aligned with and aft of forward hingeable door 36a. Forward slidable door 36b has an open position in which forward slidable door 36b is slid forward and into an exterior position relative to forward hingeable door 36a, as best seen in FIG. 2B. In the open position, forward slidable door 36b is secured against sliding movement relative to forward hingeable door 36a by a link assembly 40 that locks forward slidable door 36b and forward hingeable door 36a together, as best seen in FIG. 2I. Forward hingeable door 36a has a closed position in which forward hingeable door 36a is securably disposed within aircraft opening 32. Forward hingeable door 36a has an open position in which forward hingeable door 36a is pivoted forward relative to aircraft opening 32, as best seen in FIG. 2G. Preferably, forward slidable door 36b is placed in the open position prior to placing forward hingeable door 36a in the open position such that forward slidable door 36b is rotated together with forward hingeable door 36a between the open and closed positions.

Aft slidable door 38b has a closed position in which aft slidable door 38b is securably disposed within aircraft opening 32 and is longitudinally aligned with and forward of aft hingeable door 38a. Aft slidable door 38b has an open position in which aft slidable door 38b is slid aft and into an exterior position relative to aft hingeable door 38a, as best seen in FIG. 2C. In the open position, aft slidable door 38b is secured against sliding movement relative to aft hingeable door 38a by a link assembly 42 that locks aft slidable door 38b and aft hingeable door 38a together, as best seen in FIG. 2I. Aft hingeable door 38a has a closed position in which aft hingeable door 38a is securably disposed within aircraft opening 32. Aft hingeable door 38a has an open position in which aft hingeable door 38a is pivoted aft relative to aircraft opening 32, as best seen in FIG. 2F. Preferably, aft slidable door 38b is placed in the open position prior to placing aft hingeable door 38a in the open position such that aft slidable door 38b is rotated together with aft hingeable door 38a between the open and closed positions.

In FIG. 2A, versatile door system 34 is in the closed configuration in which forward hingeable door 36a is in the closed position, forward slidable door 36b is in the closed position, aft hingeable door 38a is in the closed position and aft slidable door 38b is in the closed position. In FIG. 2B, versatile door system 34 is in a first open configuration in which forward slidable door 36b is in the open position, forward hingeable door 36a is in the closed position, aft slidable door 38b is in the closed position and aft hingeable door 38a is in the closed position. In the illustrated open configuration, versatile door system 34 provides access to about a quarter width of aircraft opening 32. In FIG. 2C, versatile door system 34 is in a second open configuration in which forward slidable door 36b is in the closed position, forward hingeable door 36a is in the closed position, aft slidable door 38b is in the open position and aft hingeable door 38a is in the closed position. In the illustrated open configuration, versatile door system 34 provides access to about a quarter width of aircraft opening 32.

In FIG. 2D, versatile door system 34 is in a third open configuration in which forward slidable door 36b is in the open position, forward hingeable door 36a is in the closed position, aft slidable door 38b is in the open position and aft hingeable door 38a is in the closed position. In the illustrated open configuration, versatile door system 34 provides access to about a half width of aircraft opening 32. In FIG. 2E, versatile door system 34 is in a fourth open configuration in which forward slidable door 36b is in the open position, forward hingeable door 36a is in the open position, aft slidable door 38b is in the closed position and aft hingeable door 38a is in the closed position. In the illustrated open configuration, versatile door system 34 provides access to about a half width of aircraft opening 32. In FIG. 2F, versatile door system 34 is in a fifth open configuration in which forward slidable door 36b is in the closed position, forward hingeable door 36a is in the closed position, aft slidable door 38b is in the open position and aft hingeable door 38a is in the open position. In the illustrated open configuration, versatile door system 34 provides access to about a half width of aircraft opening 32.

In FIG. 2G, versatile door system 34 is in a sixth open configuration in which forward slidable door 36b is in the open position, forward hingeable door 36a is in the open position, aft slidable door 38b is in the open position and aft hingeable door 38a is in the closed position. In the illustrated open configuration, versatile door system 34 provides access to about a three quarter width of aircraft opening 32. In FIG. 2H, versatile door system 34 is in a seventh open configuration in which forward slidable door 36b is in the open position, forward hingeable door 36a is in the closed position, aft slidable door 38b is in the open position and aft hingeable door 38a is in the open position. In the illustrated open configuration, versatile door system 34 provides access to about a three quarter width of aircraft opening 32. In FIG. 2I, versatile door system 34 is in an eighth open configuration in which forward slidable door 36b is in the open position, forward hingeable door 36a is in the open position, aft slidable door 38b is in the open position and aft hingeable door 38a is in the open position. In the illustrated open configuration, versatile door system 34 provides access to about a full width of aircraft opening 32.

Figure 3A:
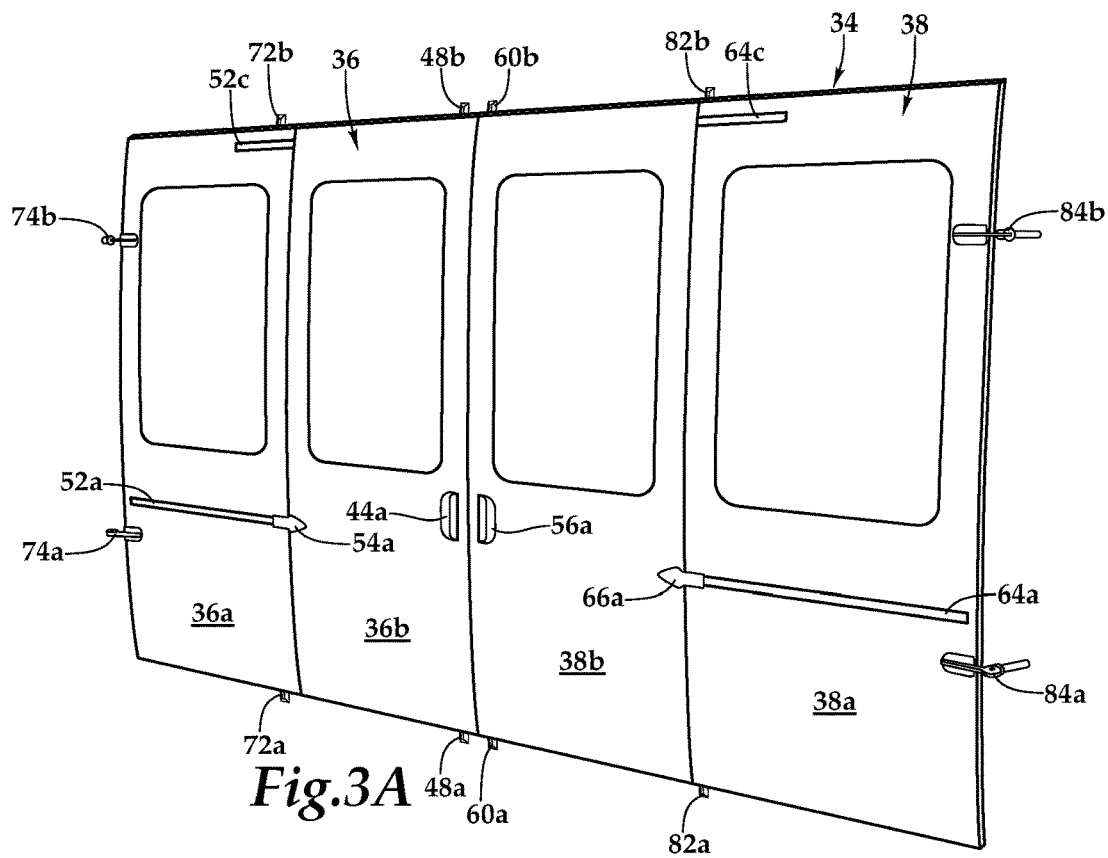
FIGS. 3A-3B are exterior and interior views of a versatile door system for an aircraft in accordance with embodiments of the present disclosure.
Figure 3B:
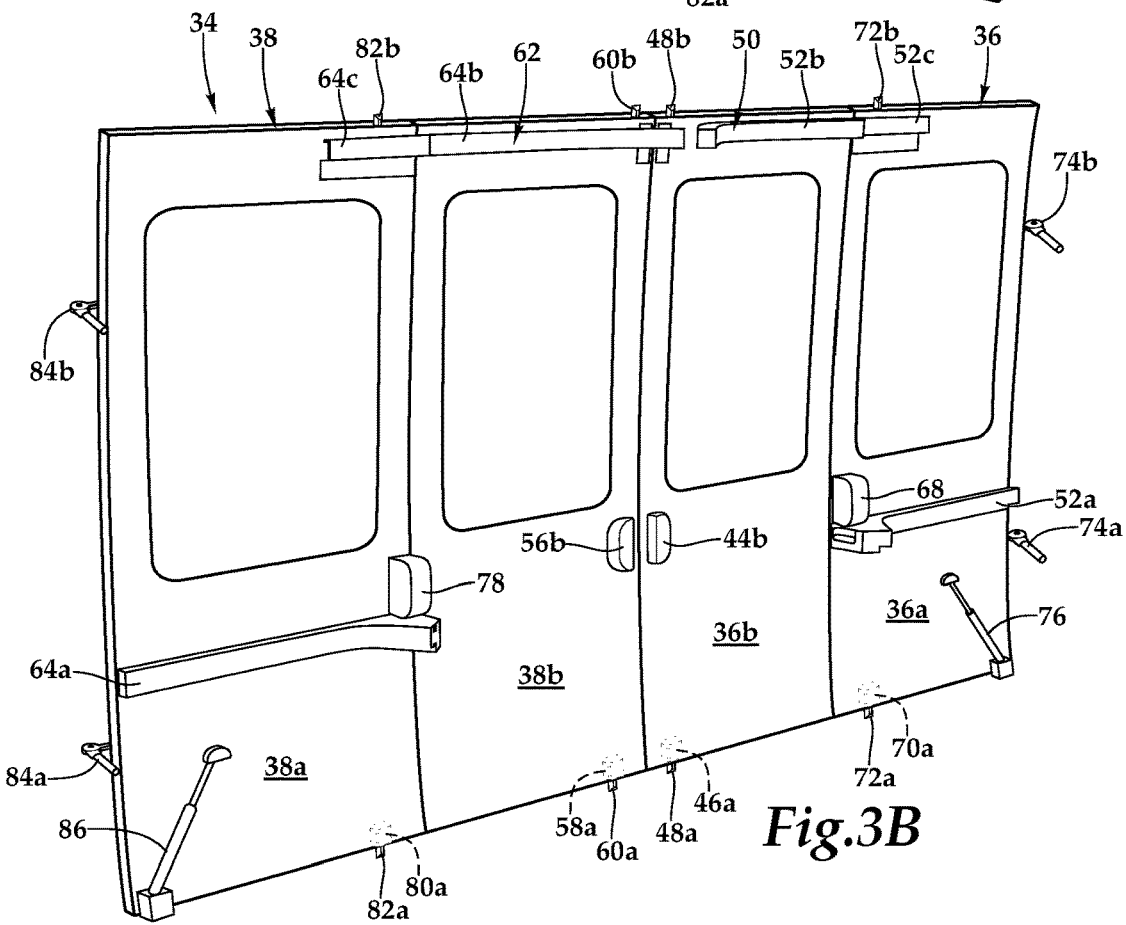

Referring additionally to FIGS. 3A-3B of the drawings, exterior and interior views of versatile door system 34 are presented. As discussed herein, versatile door system 34 includes forward door assembly 36 including forward slidable door 36b and forward hingeable door 36a and aft door assembly 38 including aft slidable door 38b and aft hingeable door 38a. Forward slidable door 36b has both an exterior handle 44a and an interior handle 44b that are operably coupled to upper and lower latch assemblies via suitable cabling and an actuation mechanism disposed within forward slidable door 36b, only lower latch assembly 46a being visible. Lower latch assembly 46a includes a latch 48a that selectively extends below forward slidable door 36b and is selectively received into a slot in airframe 12 along the bottom of aircraft opening 32 to secure forward slidable door 36b thereto when in the closed position. The upper latch assembly includes a latch 48b that selectively extends above forward slidable door 36b and is selectively received into a slot in airframe 12 along the top of aircraft opening 32 to secure forward slidable door 36b thereto when in the closed position. Exterior handle 44a and interior handle 44b are operable to shift latches 48a, 48b between extended and retracted positions to release forward slidable door 36b from airframe 12 when it is desired to open forward slidable door 36b.

Figure 4:
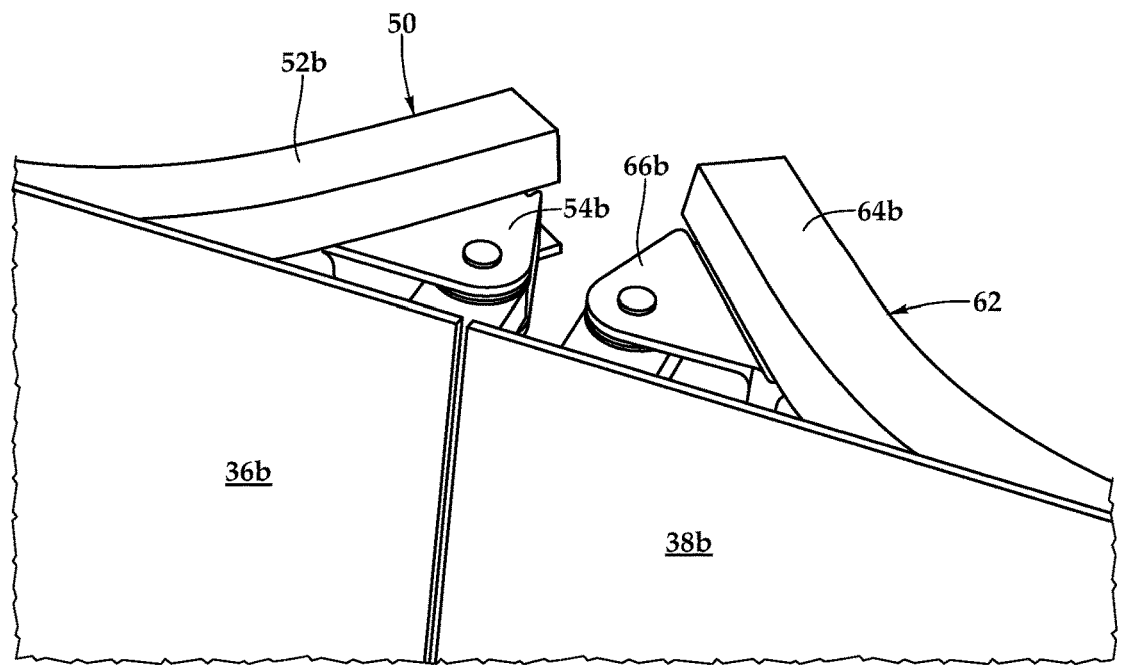
FIG. 4 is an enlarged view of a rail system a versatile door system for an aircraft in accordance with embodiments of the present disclosure.

Forward slidable door 36b is slidable on a forward rail system 50 that includes a lower rail 52a and a pair of upper rails 52b, 52c. Lower rail 52a is positioned within forward hingeable door 36a. Upper rail 52b is supported by airframe 12 near the top of aircraft opening 32, as best seen in FIG. 4. Upper rail 52c is positioned within forward hingeable door 36a. Forward slidable door 36b includes a lower slider bearing 54a that slidably engages lower rail 52a. Forward slidable door 36b also includes an upper slider bearing 54b that sequentially slidably engages upper rails 52b, 52c. The aft ends of upper rail 52b and lower rail 52a are curved such that forward slidable door 36b shifts outwardly when forward slidable door 36b is slid forward toward the open position such that forward slidable door 36b moves to an exterior position relative to forward hingeable door 36a when operated to the open position.

Aft slidable door 38b has both an exterior handle 56a and an interior handle 56b that are operably coupled to upper and lower latch assemblies via suitable cabling and an actuation mechanism disposed within aft slidable door 38b, only lower latch assembly 58a being visible. Lower latch assembly 58a includes a latch 60a that selectively extends below aft slidable door 38b and is selectively received into a slot in airframe 12 along the bottom of aircraft opening 32 to secure aft slidable door 38b thereto when in the closed position. The upper latch assembly includes a latch 60b that selectively extends above aft slidable door 38b and is selectively received into a slot in airframe 12 along the top of aircraft opening 32 to secure aft slidable door 38b thereto when in the closed position. Exterior handle 56a and interior handle 56b are operable to shift latches 60a, 60b between extended and retracted positions to release aft slidable door 38b from airframe 12 when it is desired to open aft slidable door 38b.

Aft slidable door 38b is slidable on an aft rail system 62 that includes a lower rail 64a and a pair of upper rails 64b, 64c. Lower rail 64a is positioned within aft hingeable door 38a. Upper rail 64b is supported by airframe 12 near the top of aircraft opening 32, as best seen in FIG. 4. Upper rail 64c is positioned within aft hingeable door 38a. Aft slidable door 38b includes a lower slider bearing 66a that slidably engages lower rail 64a. Aft slidable door 38b also includes an upper slider bearing 66b that sequentially slidably engages upper rails 64b, 64c. The forward ends of upper rail 64b and lower rail 64a are curved such that aft slidable door 38b shifts outwardly when aft slidable door 38b is slid aft toward the open position such that aft slidable door 38b moves to an exterior position relative to aft hingeable door 38a when operated to the open position.

Forward hingeable door 36a has an interior handle 68 that is operably coupled to upper and lower latch assemblies via suitable cabling and an actuation mechanism disposed within forward hingeable door 36a, only lower latch assembly 70a being visible. Lower latch assembly 70a includes a latch 72a that selectively extends below forward hingeable door 36a and is selectively received into a slot in airframe 12 along the bottom of aircraft opening 32 to secure forward hingeable door 36a thereto when in the closed position. The upper latch assembly includes a latch 72b that selectively extends above forward hingeable door 36a and is selectively received into a slot in airframe 12 along the top of aircraft opening 32 to secure forward hingeable door 36a thereto when in the closed position. Interior handle 68 is operable to shift latches 72a, 72b between extended and retracted positions to release forward hingeable door 36a from airframe 12 when it is desired to open forward hingeable door 36a.

Forward hingeable door 36a pivots relative to a forward beam of airframe opening 32 on a pair of hinge assemblies 74a, 74b. The distance and speed of travel of forward hingeable door 36a during opening and closing operations may be regulated by forward door strut 76 that is coupled between airframe 12 and forward hingeable door 36a. Preferably, forward door strut 76 and/or hinge assemblies 74a, 74b limit the rotational travel of forward hingeable door 36a to between about ninety degrees and about one hundred degrees such that forward hingeable door 36a will not contact other airframe members during operations. Forward door strut 76 also maintains forward hingeable door 36a in the open position. In the illustrated embodiment, forward hingeable door 36a should only be operated between the open and closed positions when forward slidable door 36b has moved to its exterior position relative to forward hingeable door 36a and been secured therein.

Aft hingeable door 38a has an interior handle 78 that is operably coupled to upper and lower latch assemblies via suitable cabling and an actuation mechanism disposed within aft hingeable door 38a, only lower latch assembly 80a being visible. Lower latch assembly 80a includes a latch 82a that selectively extends below aft hingeable door 38a and is selectively received into a slot in airframe 12 along the bottom of aircraft opening 32 to secure aft hingeable door 38a thereto when in the closed position. The upper latch assembly includes a latch 82b that selectively extends above aft hingeable door 38a and is selectively received into a slot in airframe 12 along the top of aircraft opening 32 to secure aft hingeable door 38a thereto when in the closed position. Interior handle 78 is operable to shift latches 82a, 82b between extended and retracted positions to release aft hingeable door 38a from airframe 12 when it is desired to open aft hingeable door 38a.

Aft hingeable door 38a pivots relative to an aft beam of airframe opening 32 on a pair of hinge assemblies 84a, 84b. The distance and speed of travel of aft hingeable door 38a during opening and closing operations may be regulated by aft door strut 86 that is coupled between airframe 12 and aft hingeable door 38a. Preferably, aft door strut 86 and/or hinge assemblies 84a, 84b limit the rotational travel of aft hingeable door 38a to between about ninety degrees and about one hundred degrees such that aft hingeable door 38a will not contact other airframe members during operations. Aft door strut 86 also maintains aft hingeable door 38a in the open position. In the illustrated embodiment, aft hingeable door 38a should only be operated between the open and closed positions when aft slidable door 38b has moved to its exterior position relative to aft hingeable door 38a and been secured therein.

Even though forward slidable door 36b, forward hingeable door 36a, aft slidable door 38b and aft hingeable door 38a have each been described as having a latch system that is actuated responsive to operation of interior and/or exterior handles, in other embodiments, some or all of forward slidable door 36b, forward hingeable door 36a, aft slidable door 38b and aft hingeable door 38a could alternatively or additionally have dedicated latch assemblies that are independent of the interior and exterior handles and that are manually or automatically operated to secure forward slidable door 36b, forward hingeable door 36a, aft slidable door 38b and/or aft hingeable door 38a to airframe 12 when forward slidable door 36b, forward hingeable door 36a, aft slidable door 38b and/or aft hingeable door 38a are in their closed positions.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A versatile door system for an aircraft having an airframe including a wing and an aircraft opening that is forward of the wing, the door system comprising:
   a forward door assembly including a forward hingeable door and a forward slidable door, the forward hingeable door hingeably coupled to the airframe proximate a forward location of the aircraft opening, the forward slidable door slidably coupled to the forward hingeable door;
   an aft door assembly including an aft hingeable door and an aft slidable door, the aft hingeable door hingeably coupled to the airframe proximate an aft location of the aircraft opening, the aft slidable door slidably coupled to the aft hingeable door;
   a limiter coupled between the aft hingeable door and the airframe; and
   a rail system including a segmented aft upper rail having a first portion coupled to the airframe and a second portion formed on an exterior side of the aft hingeable door;
   wherein, the aft slidable door includes a slider bearing configured to sequentially engage the first and second portions of the segmented aft upper rail along a path of travel of the aft slidable door;
   wherein, in a closed configuration, the forward hingeable door, the forward slidable door, the aft hingeable door and the aft slidable door are securably disposed within the aircraft opening;
   wherein, the limiter is configured to restrict rotational travel of the aft door assembly to prevent contact between the aft door assembly and the wing; and
   wherein, the forward hingeable door, the forward slidable door, the aft hingeable door and the aft slidable door are individually operable to collectively provide access to a selectable width of the aircraft opening.

2. The door system as recited in claim 1 wherein the forward slidable door has a closed position in which the forward slidable door is disposed within the aircraft opening and is longitudinally aligned with the forward hingeable door and an open position in which the forward slidable door is slid forward and into an exterior position relative to the forward hingeable door;
   wherein the forward hingeable door has a closed position in which the forward hingeable door is disposed within the aircraft opening and an open position in which the forward hingeable door is pivoted forward relative to the forward location of the aircraft opening together with the forward slidable door;
   wherein the aft slidable door has a closed position in which the aft slidable door is disposed within the aircraft opening and is longitudinally aligned with the aft hingeable door and an open position in which the aft slidable door is slid aft and into an exterior position relative to the aft hingeable door; and
   wherein the aft hingeable door has a closed position in which the aft hingeable door is disposed within the aircraft opening and an open position in which the aft hingeable door is pivoted aft relative to the aft location of the aircraft opening together with the aft slidable door.

3. The door system as recited in claim 2 wherein, in an open configuration, the forward slidable door is in the open position, the forward hingeable door is in the closed position, the aft slidable door is in the closed position and the aft hingeable door is in the closed position such that the door system provides access to about a quarter width of the aircraft opening.

4. The door system as recited in claim 2 wherein, in an open configuration, the forward slidable door is in the closed position, the forward hingeable door is in the closed position, the aft slidable door is in the open position and the aft hingeable door is in the closed position such that the door system provides access to about a quarter width of the aircraft opening.

5. The door system as recited in claim 2 wherein, in an open configuration, the forward slidable door is in the open position, the forward hingeable door is in the open position, the aft slidable door is in the closed position and the aft hingeable door is in the closed position such that the door system provides access to about a half width of the aircraft opening.

6. The door system as recited in claim 2 wherein, in an open configuration, the forward slidable door is in the open position, the forward hingeable door is in the closed position, the aft slidable door is in the open position and the aft hingeable door is in the closed position such that the door system provides access to about a half width of the aircraft opening.

7. The door system as recited in claim 2 wherein, in an open configuration, the forward slidable door is in the closed position, the forward hingeable door is in the closed position, the aft slidable door is in the open position and the aft hingeable door is in the open position such that the door system provides access to about a half width of the aircraft opening.

8. The door system as recited in claim 2 wherein, in an open configuration, the forward slidable door is in the open position, the forward hingeable door is in the open position, the aft slidable door is in the open position and the aft hingeable door is in the closed position such that the door system provides access to about a three quarter width of the aircraft opening.

9. The door system as recited in claim 2 wherein, in an open configuration, the forward slidable door is in the open position, the forward hingeable door is in the closed position, the aft slidable door is in the open position and the aft hingeable door is in the open position such that the door system provides access to about a three quarter width of the aircraft opening.

10. The door system as recited in claim 2 wherein, in an open configuration, the forward slidable door is in the open position, the forward hingeable door is in the open position, the aft slidable door is in the open position and the aft hingeable door is in the open position such that the door system provides access to about a full width of the aircraft opening.

11. The door system as recited in claim 2 wherein, when the forward slidable door is in the open position, the forward slidable door is secured against movement relative to the forward hingeable door; and
   wherein, when the aft slidable door is in the open position, the aft slidable door is secured against movement relative to the aft hingeable door.

12. The door system as recited in claim 1 wherein, in the closed configuration, the forward hingeable door, the forward slidable door, the aft hingeable door and the aft slidable door are latched to the airframe.

13. The door system as recited in claim 1 wherein the rail system further comprises a forward upper rail, a forward lower rail and an aft lower rail;

wherein the forward upper rail is at least partially coupled to the airframe;

wherein the forward lower rail is coupled to the forward hingeable door;

wherein the aft lower rail is coupled to the aft hingeable door;

wherein the forward slidable door travels on the forward upper rail and the forward lower rail between open and closed positions; and wherein the aft slidable door travels on the segmented aft upper rail and the aft lower rail between open and closed positions.

14. The door system as recited in claim 1 wherein the limiter is configured to restrict rotational travel of the aft hingeable door to between about ninety degrees and about one hundred degrees relative to the aft location of the aircraft opening to prevent contact between the aft door assembly and the wing.

15. The door system as recited in claim 1 wherein the limiter further comprises at least one hinge.

16. The door system as recited in claim 1 wherein the limiter further comprises a strut.

17. An aircraft comprising:

an airframe having a wing and an aircraft opening that is forward of the wing; and a versatile door system coupled to the airframe, the door system including:

a forward door assembly including a forward hingeable door and a forward slidable door, the forward hingeable door hingeably coupled to the airframe proximate a forward location of the aircraft opening, the forward slidable door slidably coupled to the forward hingeable door;

an aft door assembly including an aft hingeable door and an aft slidable door, the aft hingeable door hingeably coupled to the airframe proximate an aft location of the aircraft opening, the aft slidable door slidably coupled to the aft hingeable door;

a limiter coupled between the aft hingeable door and the airframe; and a rail system including a segmented aft upper rail having a first portion coupled to the airframe and a second portion formed on an exterior side of the aft hingeable door;

wherein, the aft slidable door includes a slider bearing configured to sequentially engage the first and second portions of the segmented aft upper rail along a path of travel of the aft slidable door;

wherein, in a closed configuration, the forward hingeable door, the forward slidable door, the aft hingeable door and the aft slidable door are securably disposed within the aircraft opening;

wherein, the limiter is configured to restrict rotational travel of the aft door assembly to prevent contact between the aft door assembly and the wing; and wherein, the forward hingeable door, the forward slidable door, the aft hingeable door and the aft slidable door are individually operable to collectively provide access to a selectable width of the aircraft opening.

18. The aircraft as recited in claim 17 wherein the aircraft further comprises a rotorcraft.

19. The aircraft as recited in claim 17 wherein the aircraft further comprises a helicopter.

20. The aircraft as recited in claim 17 wherein the aircraft further comprises a compound helicopter.

* * * * *